(12) United States Patent
Conrad et al.

(10) Patent No.: US 6,333,017 B1
(45) Date of Patent: Dec. 25, 2001

(54) METHOD FOR THE PRODUCTION OF OZONE

(75) Inventors: Wayne Ernest Conrad; Ted Szylowiec, both of Hampton (CA)

(73) Assignee: Omachron Technologies, Inc., Katonah, NY (US)

( * ) Notice: Subject to any disclaimer, the term of this patent is extended or adjusted under 35 U.S.C. 154(b) by 0 days.

(21) Appl. No.: 09/353,118

(22) Filed: Jul. 14, 1999

(51) Int. Cl.[7] .......................... C01B 13/00; C01B 13/10
(52) U.S. Cl. .............................. 423/581; 423/579
(58) Field of Search ............................ 423/579, 581

(56) References Cited

U.S. PATENT DOCUMENTS 4,167,466 * 9/1979 Orr, Jr. et al. .................... 423/581
4,668,498 * 5/1987 Davis .............................. 423/579

* cited by examiner

Primary Examiner—Wayne Langel
(74) Attorney, Agent, or Firm—Hale and Dorr LLP

(57) ABSTRACT

A method of producing ozone comprises heating a gas containing molecular oxygen under pressure in a first vessel to a temperature of greater than about (eg.) 2300° K to at least partially dissociate molecular oxygen into monoatomic oxygen. The monoatomic oxygen is supersonically transported from the first vessel to a second vessel at a temperature less than about (eg.) 1000° K via a convergent-divergent nozzle, where it forms ozone. Supersonically transporting the monoatomic oxygen via the convergent-divergent nozzle produces frozen flow conditions, thereby preserving the oxygen in its monoatomic state. Optionally, the monoatomic oxygen is mixed with the molecular oxygen to form ozone.

21 Claims, 2 Drawing Sheets

METHOD FOR THE PRODUCTION OF OZONE

FIELD OF THE INVENTION

The present invention relates to a method for producing ozone. One particular aspect of the invention relates to a method for producing ozone utilizing supersonic expansion of monoatomic oxygen.

BACKGROUND TO THE INVENTION

Ozone is a very powerful oxidant, and has many commercial applications. One application of ozone is in the purification of drinking water. Ozone may be used to purify drinking water either on a small scale or on a large scale. For example, existing municipal water treatment facilities have been upgraded to use ozone to purify drinking water. One of the benefits of using ozone as a water purifier is that at standard water treatment conditions it decomposes into molecular oxygen very quickly, leaving little residual contaminants.

Ozone is typically produced by the reaction between molecular oxygen and monoatomic oxygen. The equilibrium of the chemical reaction may be represented by equation I:

$$O_2 + O \Longleftrightarrow O_3 \qquad (I)$$

One significant problem encountered in the commercial production of ozone is that the required monoatomic oxygen exists only at temperatures above about 2300° K. However, ozone is stable only at lower temperatures, eg. below about 1000° K. At temperatures above about 1000° K, ozone dissociates to form molecular oxygen and monoatomic oxygen. At temperatures below 2300° K, monoatomic oxygen recombines to form molecular oxygen. This is problematic since temperatures above 2300° K are necessary to form the monoatomic oxygen required to produce ozone, yet the ozone itself is almost immediately destroyed at temperatures above 1000° K.

In an effort to overcome this significant problem, attempts have been made to commercially produce ozone at low temperatures (below about 500° K) in order to increase its useful life. While attempts to date have been moderately successful, they have significant drawbacks, in that the total volume of ozone capable of being produced is small.

A typical method for the commercial production of ozone uses high voltage corona discharges. These discharges produce energized electrons which are supplied to a source of molecular oxygen, causing the molecular oxygen to dissociate into monoatomic oxygen. Some of the monoatomic oxygen then reacts with molecular oxygen, via a three-body interaction, to form ozone. Because the gas source of molecular oxygen is maintained at a low temperature (below 500° K), a significant portion of the ozone produced survives to its point of use. However, overall this method is inefficient because only a small amount of molecular oxygen is converted into monoatomic oxygen by the excited electrons. That is, a very large number of electrons (and a correspondingly large amount of energy to produce the electrons) is required to produce a very small amount of monoatomic oxygen. This is the rate limiting step in the production of ozone by this method. These types of systems are only capable of producing a small net amount of ozone.

Alternately, ozone may be produced with ultraviolet radiation. In this method, ultraviolet light photons are bombarded at molecular oxygen, causing molecular oxygen to dissociate into monoatomic oxygen. The monoatomic oxygen then reacts with molecular oxygen via the three bodied interaction to form ozone. This reaction proceeds by the Chapman mechanism, which is essentially how ozone is created in the upper atmosphere of the earth. As with the high voltage method of creating ozone, ozone production with ultraviolet light is limited since the vast majority of ultraviolet radiation passes through oxygen without causing the molecular oxygen to dissociate. That is, the limiting step in the formation of ozone is the formation of monoatomic oxygen.

In each of these systems, it is only possible to obtain a significant production of ozone by operating a large number of systems in parallel. This results in large acquisition and operating costs. Therefore, there remains a need to develop a method of producing significant quantities of ozone on a cost effective, commercial scale basis, and which has a useful life before deterioration.

SUMMARY OF THE INVENTION

The present invention provides a method for producing ozone utilizing conditions which favour both the formation of monoatomic oxygen and the formation of ozone from the monoatomic oxygen. The monoatomic oxygen is transported to the ozone production stage in a frozen flow state so as to deliver monoatomic oxygen in substantial quantities to the ozone production stage. By operating different steps of the process at conditions which favour these reactions, an energy efficient method of producing ozone is provided. Thus, an ozone flow rate of up to 0.5 kg/s may be achieved.

In one aspect of the present invention, there is provided a method of producing ozone comprising providing a supply of monoatomic oxygen at a first temperature and pressure at which the equilibrium between monoatomic oxygen and molecular oxygen lies in favour of production of monoatomic oxygen, supersonically expanding and cooling the monoatomic oxygen to a second temperature lower than the first temperature (eg. below about 1000° K) to obtain supersonically cooled and expanded monoatomic oxygen, and combining the supersonically cooled and expanded monoatomic oxygen to form ozone.

In one embodiment, the step of producing monoatomic comprises subjecting a gas containing molecular oxygen to conditions which shift the equilibrium to the right side of the equation:

$$O_2 \Longleftrightarrow 2O$$

to favour the production of monoatomic oxygen over the production of molecular oxygen. The monoatomic oxygen may be formed by heating a gas (eg. to a temperature above about 2300° K) containing molecular oxygen to favour the production of monoatomic oxygen.

In another embodiment, the step of expanding and cooling the monoatomic oxygen comprises passing the monoatomic oxygen through a convergent-divergent nozzle.

In another embodiment, the step of combining the supersonically cooled and expanded monoatomic oxygen to form ozone is conducted under conditions which shifts the equilibrium to favour the production of ozone.

In another embodiment, the supersonically cooled and expanded monoatomic oxygen is subjected to an elevated pressure to assist in the formation of ozone.

In another embodiment, the method further comprises the step of introducing molecular oxygen to the supersonically cooled and expanded monoatomic oxygen to form ozone. The molecular and monoatomic oxygen may be mixed under conditions which shift the equilibrium to the right hand side of the equation:

$$O+O_2 <=====> O_3$$

to favour production of ozone (eg. at a temperature below about 1000° K and/or under pressure).

In another aspect of the present invention, there is provided a method of producing ozone comprising providing a supply of monoatomic oxygen at conditions at which the equilibrium between monoatomic oxygen and molecular oxygen lies in favour of the production of monoatomic oxygen, transporting the monoatomic oxygen as a flow stream under frozen flow state conditions from a first location to a second location, and combining the monoatomic oxygen to form ozone.

In one embodiment, the monoatomic oxygen is combined at conditions at which the equilibrium between monoatomic oxygen and ozone lies in favour of the production of ozone.

In another embodiment, molecular oxygen is introduced to the monoatomic oxygen to form ozone. The monoatomic oxygen and the molecular oxygen may be combined at conditions at which the equilibrium between monoatomic oxygen, molecular oxygen and ozone lies in favour of the production of ozone. The molecular oxygen may be introduced to the monoatomic oxygen while the monoatomic oxygen is in the frozen flow state and the flow stream is then subjected to conditions at which the equilibrium between monoatomic oxygen, molecular oxygen and ozone lies in favour of the production of ozone. Alternately, or in addition, the second location is at conditions at which the equilibrium between monoatomic oxygen, molecular oxygen and ozone lies in favour of the production of ozone and the flow stream and a stream of molecular oxygen are introduced to the second location to form ozone.

In another embodiment, the step of producing monoatomic comprises subjecting a gas containing molecular oxygen to conditions which shift the equilibrium to the right side of the equation:

$$O_2 <=====> 2O$$

to favour the production of monoatomic oxygen over the production of molecular oxygen.

In another embodiment, the step of producing monoatomic oxygen comprises heating a gas containing molecular oxygen under pressure to favour the production of monoatomic oxygen.

In another embodiment, the frozen flow state is maintained until the monoatomic oxygen is at conditions which favour the production of ozone.

In another embodiment, the frozen flow state is maintained until the monoatomic oxygen is at a temperature below about 1000° K.

In another aspect of the present invention, there is provided a method of producing ozone comprising heating molecular oxygen under pressure to a temperature greater than about 2300° K to cause at least a portion of the molecular oxygen to dissociate into monoatomic oxygen, and expanding and cooling the monoatomic oxygen under frozen flow conditions to a temperature below about 1000° K to form ozone.

In one embodiment, the expanded and cooled monoatomic oxygen is mixed with molecular oxygen to form ozone.

In another embodiment, the step of heating the molecular oxygen comprises heating the oxygen to a temperature from about 3000 to about 5000° K.

In another embodiment, the step of expanding and cooling the monoatomic oxygen comprises passing the monoatomic oxygen through a convergent-divergent nozzle having an inlet and an outlet at a supersonic speed.

In another embodiment, the step of mixing the molecular and monoatomic oxygen comprises mixing under conditions which shift the equilibrium to the right in the equation:

$$O+O_2 <=====> O_3$$

to favour production of ozone.

In another embodiment, the step of mixing the monoatomic and molecular oxygen comprises mixing the monoatomic and molecular oxygen under pressure.

In another embodiment, after the monoatomic oxygen is produced, it is subjected to equilibrium conditions which favour the production of ozone.

In another embodiment, the monoatomic oxygen is expanded and cooled to a temperature from about 300 to about 500° K.

In another embodiment, after the monoatomic oxygen is produced, it is raised to an elevated pressure to assist in the formation of ozone.

DESCRIPTION OF THE DRAWINGS

These and other aspects of the present invention will be apparent from the following detailed description of the invention, taken together with drawings, in which.

DETAILED DESCRIPTION OF THE PREFERRED EMBODIMENT

Figure 1:
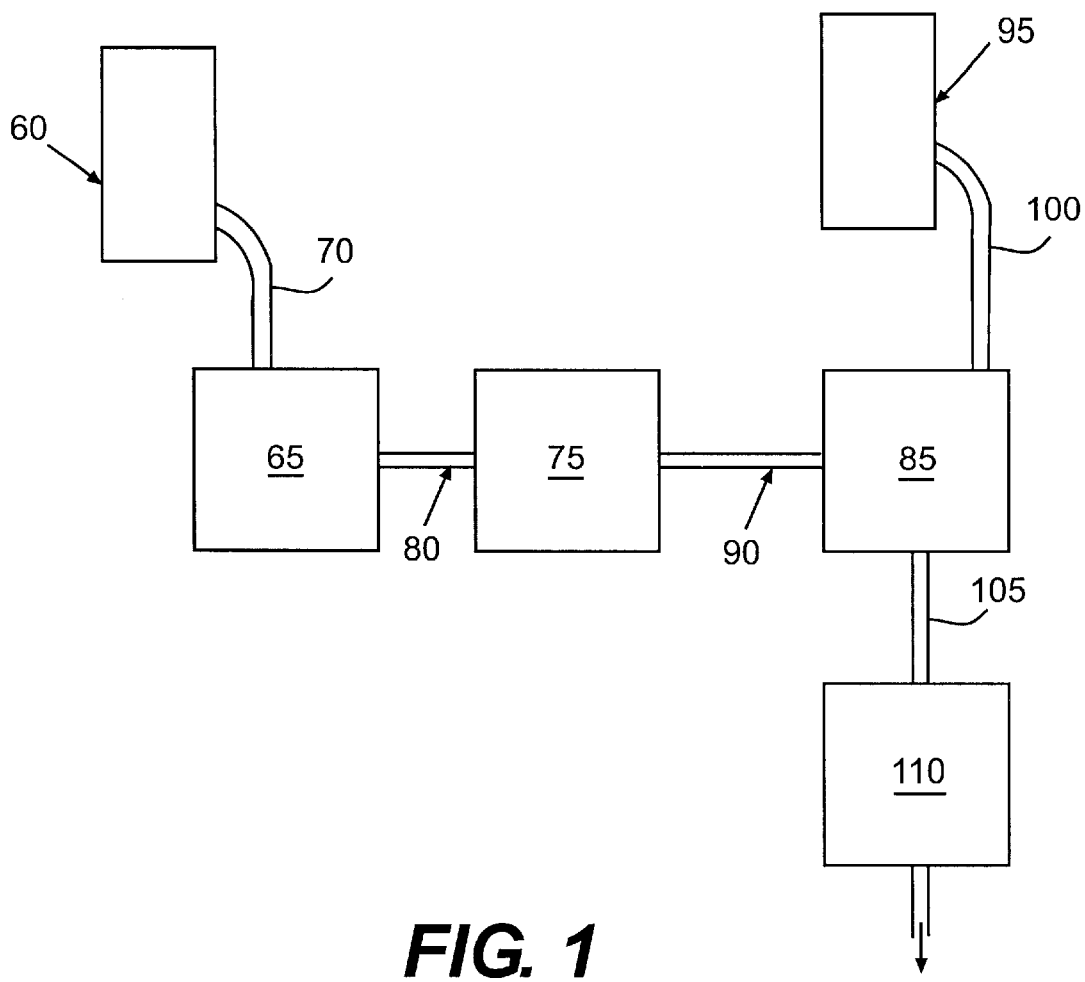
FIG. 1 is a schematic diagram showing in block form various aspects to a preferred embodiment of the present invention.

The method of the present invention may be used to produce ozone. In general, the production of ozone comprises two general steps: (1) the production of monoatomic oxygen, and (2) the reaction of monoatomic oxygen with molecular oxygen to produce ozone.

The production of monoatomic oxygen may be generally summarized by Equation II:

$$O_2 <=====> 2O \qquad (II)$$

The reaction shown in Equation II is a "two way" reaction, and both molecular and monoatomic oxygen are present in equilibrium. The state of equilibrium is a function of surrounding conditions, including temperature and pressure. Therefore, it is desirable to create conditions which favour the production of monoatomic oxygen over the production of molecular oxygen.

While the production of monoatomic oxygen may be accomplished in any known manner, in order to shift the equilibrium in favour of the production of monoatomic oxygen, the preferred method is to subject molecular oxygen to conditions at which the reaction of Equation II will favour the production of molecular oxygen. Thus, monoatomic oxygen is created by adjusting the conditions (eg. temperature and/or pressure) to which the molecular oxygen is subjected so that the reaction equilibrium will cause monoatomic oxygen to be produced. To this end a source of molecular oxygen is subjected to conditions which will cause molecular oxygen to dissociate to monoatomic oxygen. It will be appreciated that the process may be operated at any conditions that will cause some molecular oxygen to dissociate to monoatomic oxygen. However, the lower the proportion of molecular oxygen which dissociates to monoatomic oxygen, the lower the amount of ozone that will be prepared according to this process. Preferably, a source of molecular oxygen gas is heated to a temperature above about 2300° K, preferably from about 3,000 to about 5000° K and most preferably from about 4,000 to about 4500° K. At temperatures above about 2300° K, the equilibrium in Equation II favours the production of monoatomic oxygen over the production of molecular oxygen such that The pressure and temperature are limited at their upper end by the material used to conduct the dissociation step pursuant to Equation II.

The rate of recombination of monoatomic oxygen into ozone is the limiting process in the formation of ozone. Monoatomic oxygen is generally stable only at temperatures above 2300° K. However, since ozone is unstable at temperatures above about 1000° K, it is necessary to cool the monoatomic oxygen to a temperature below about 1000° K before reacting the monoatomic oxygen with molecular oxygen to form ozone. Thus, it is necessary to cool the monoatomic oxygen to conditions at which ozone is stable while preventing the equilibrium shown in Equation II from shifting to the left, ie. conversion of the monoatomic oxygen into molecular oxygen. While the conversion of monoatomic oxygen into molecular oxygen is inevitable as the gas cools, it does take a finite period of time to take place. Therefore, the key is to utilize the monoatomic oxygen prior to its conversion into molecular oxygen. The rate of conversion of monoatomic oxygen into molecular oxygen is temperature dependent, and may be described by standard chemical kinetic rate factors.

The present inventors have surprisingly discovered that the equilibrium in Equation II can be maintained in favour of the production of monoatomic oxygen for a sufficient period of time to form ozone while bring the gas containing monoatomic oxygen to conditions at which the formation of ozone from monoatomic oxygen and molecular oxygen are favoured. This may be achieved by supersonically expanding and cooling the monoatomic oxygen from conditions where the equilibrium lies in favour of production of monoatomic oxygen (high temperature and pressure) to conditions at which the production of ozone is favoured. Preferably, the monoatomic oxygen is supersonically expanded and cooled by passing it through a supersonic nozzle, also known as a convergent-divergent nozzle. The monoatomic gas is preferably cooled to a temperature from about 100 to about 1,000° K, more preferably from about 300 to about 500° K and most preferably from about 250 to about 350° K. A typical convergent-divergent nozzle generally referred to by reference numeral 10 is shown in FIG. 2.

Figure 2:
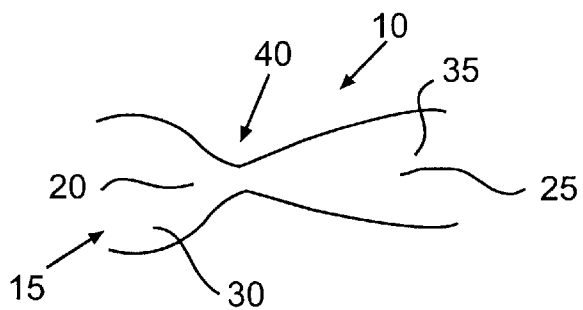
FIG. 2 is a longitudinal cross-sectional view of a convergent-divergent nozzle which may be used in accordance with a preferred embodiment of the present invention.

As shown in FIG. 2, a standard convergent-divergent nozzle has an inlet 15, a throat 20, and an outlet 25. The inlet 15 has a convergent portion 30, where the cross sectional area of the nozzle decreases, thereby restricting the flow of a fluid through the nozzle. As the convergent portion 30 approaches the throat 20, the cross sectional area of the nozzle is at a minimal. Downstream of the throat 20, the nozzle has a divergent portion 35. In the divergent portion 35, the cross-sectional area of the nozzle is asymptotic. In order to obtain supersonic flow within the convergent-divergent nozzle, the exact geometry of the nozzle will vary depending upon the difference in pressure at the inlet 15 and the outlet 25. In the preferred embodiment of the present invention, the design of the convergent-divergent nozzle is such that the flow of monoatomic oxygen through the nozzle is supersonic throughout the entire divergent portion of the nozzle. Convergent-divergent nozzles are known in the art.

The process may be operated at any pressure. It will be appreciated that the pressure differential across a nozzle 10 in the process of this invention is similar to the Isentropic flows in convergent divergent nozzles in other uses.

Supersonic expansion cooling is one of the fastest gas cooling processes known. As the gas passes through the convergent-divergent nozzle from an area of high temperature and pressure to an area of low temperature and pressure, the temperature gradient over the length of the nozzle can be very large, on the order of $10^7$ K/m, and the gas may be cooled at rates on the order of $10^6$ K/s. Thus a gas containing molecular oxygen which has had a portion (eg.>5%) of the molecular oxygen dissociate to monoatomic oxygen may be introduced into inlet 15. By the time the gas reaches outlet 25, the temperature of the gas may be below 1000° K. The actual temperature may be varied by the design of the nozzle. The nozzle is designed so that the gas at outlet 25 is at conditions which favour the production of ozone.

Recombination of the monoatomic oxygen to form oxygen according to Equation II takes a finite amount of time. The reaction rate will depend upon the temperature and pressure of the reactants. By using supersonic expansion of the gas containing monoatomic oxygen, the gas may be cooled at a rate which is faster than the recombination reaction rate so that at outlet 25 the gas still contains a useable amount of monoatomic oxygen. When the supersonic expansion cooling rate of the gas flow is of the same magnitude or larger than the recombination reaction rate, a situation called frozen flow is created. Due to the high velocity of the gas stream, the reaction between the constituents of the gas stream are effectively halted over large downstream distances from throat 20. Thus the monoatomic oxygen may be delivered to a reactor or the like where it may be combined with molecular oxygen to form ozone according to Equation I.

As shown in the convergent-divergent nozzle of FIG. 2, the frozen flow state commences at about the narrowest portion of nozzle 10 where the supersonic flow commences (as indicated by reference numeral 40). As the monoatomic oxygen enters the nozzle at inlet 15, it accelerates through the throat 20 where it reaches supersonic speeds, and enters a "frozen flow" state. In this region, the monoatomic oxygen cools very quickly as it expands (eg. to a temperature preferably below about 1000° K). However, during this time, very little of the monoatomic oxygen reacts to form molecular oxygen, even though the reduction in temperature and pressure favours a shift in the equilibrium of Equation II for the formation of molecular oxygen. Therefore, monoatomic oxygen can be formed at high temperatures (where the equilibrium favours its production), and at least a portion of it and preferably most of it can be preserved while it cools to temperatures where it can be used to produce ozone and at which ozone is relatively stable.

Figure 3:
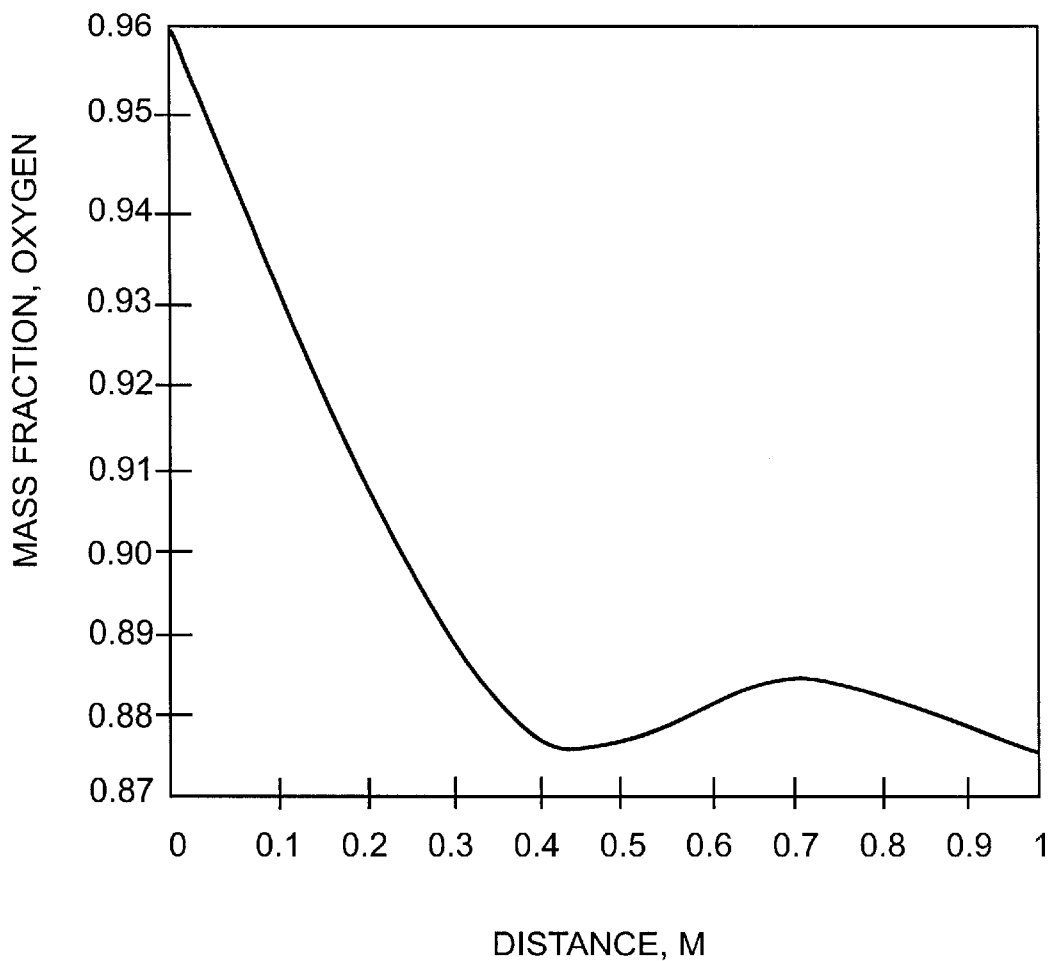
FIG. 3 is a graph of mass fraction of monoatomic oxygen as a function of the convergent-divergent nozzle length shown in FIG. 2.

Referring now to FIG. 3, there is shown a graph of the mass fraction of monoatomic oxygen as a function of the length of a convergent-divergent nozzle. The graph was prepared by numerical simulation. In FIG. 3, the inlet temperature of the monoatomic oxygen is approximately 5900° K, and the outlet temperature is approximately 1000° K. It can be seen that the mass fraction of O at the inlet of the nozzle is approximately 96%. While the amount of monoatomic oxygen initially drops as it proceeds through the nozzle (to about 87.5% at about 0.4 metres along the nozzle), the mass fraction of monoatomic oxygen essentially freezes at a significant level (above 87%). By varying the asymptotic angle of the divergent portion of the convergent-divergent nozzle, it is possible to achieve different exit temperatures.

Ozone is then formed after the flow stream has passed through the divergent area of the nozzle 10. Ozone may be formed by the monoatomic oxygen recombining to form ozone at conditions which favour the formation of ozone. According to this embodiment two reactions may occur simultaneously, namely monoatomic oxygen may recombine to form oxygen and oxygen and monoatomic oxygen may combine to form ozone. These reactions may be generalized as follows:

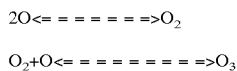

Alternately, after passing through the divergent area of the nozzle, monoatomic oxygen may be mixed with molecular oxygen at conditions which favour the formation of ozone. In the preferred embodiment, the monoatomic oxygen is mixed with cold molecular oxygen (eg. at a temperature below 1000° K and more preferably from about 300 to about 500° K and most preferably from about 250 to about 350° K) at elevated pressure conditions. LeChatelier's Principle states that if a system at equilibrium is subjected to a disturbance or stress that changes any of the factors that determine the state of equilibrium, the system will react in such a way so as to minimize the effect of the disturbance. Therefore, if the system described by equation I is at equilibrium (ie. molecular oxygen and monoatomic oxygen in equilibrium with ozone) and the pressure of the system is increased, the equilibrium will shift to minimize the effects of the pressure increase. That is, the system will attempt to reduce the pressure by shifting the equilibrium in favour of ozone production, since one ozone molecule takes up less space than one molecular oxygen molecule and one monoatomic oxygen. Therefore, an increase in pressure will increase production of ozone.

Accordingly, the molecular oxygen may be added at any point downstream of the creation of the frozen flow state. For example, cold molecular oxygen may be added immediately downstream of the divergent area of the nozzle, at any point during the passage of the gas in the frozen flow state to the zone where the ozone is to be formed or subsequent to the monoatomic oxygen being compressed to raise it to an elevated pressure (eg. by passing the gas flow through a compressor), After production of the ozone, it may be transported to the desired point of use. Preferably, if the ozone is to be used in certain applications where it is undesirable to have the ozone in a concentrated stream, but rather it is desirable to have the ozone used over a wide area, the ozone may be passed through a diffuser. An example of such an application is where ozone is used as a water purifier. In this case, it is desirable to diffuse the ozone prior to or as it passes into the water to be treated, which ensures that the ozone reaches a greater percentage of the water than if it passes through the water in a concentrated stream. Ozone diffusers are known in the art.

Referring now to FIG. 1, an example of an apparatus which may be used in accordance with the present invention is described. A supply of oxygen gas 60 is in communication with a first vessel 65 via a hose or pipe 70. The first vessel 65 is constructed in a manner so as to withstand the high temperature and pressure required to produce monoatomic oxygen from the oxygen gas supplied from gas supply 60.

Preferably, the first vessel 65 is made of a refractory material which can withstand the temperature and pressure of the process.

Upon entering the first vessel 65, the oxygen gas is heated, preferably with an arc heater (not shown) to a temperature greater than about 2300° K, causing at least a portion of the oxygen gas to dissociate into monoatomic oxygen. It will be appreciated that the efficiency of the process will vary depending upon the percentage of the molecular oxygen that is converted to monoatomic oxygen and that any desired percentage conversion may be used.

The first vessel 65 is in communication with the inlet of a convergent-divergent nozzle 75 (as previously described in relation to FIG. 2) via a hose or pipe 80. The outlet of the convergent-divergent nozzle 75 is in communication with a second vessel 85 via a hose or pipe 90. Also in communication with the second vessel 85 via a pipe or hose 100 is a supply of oxygen gas 95. The monoatomic oxygen transported through the convergent-divergent nozzle 75 and molecular oxygen from the oxygen supply 95 are mixed in the second vessel 85. In order to minimize the loss of monoatomic oxygen prior to the production of ozone, the molecular oxygen may be combined with the monoatomic oxygen while the monoatomic oxygen is still in the frozen flow state (eg. the molecular oxygen stream may be introduced into hose 90 or at the exit to nozzle 75) or the frozen flow state may be maintained until the monoatomic oxygen stream is introduced into second vessel 85. A compressor may be positioned between nozzle 75 and second vessel 85 to raise the gas to an elevated temperature. As discussed above, it will be appreciated that in an alternate embodiment, ozone may be produced without the use of the supply of oxygen gas 95.

The second vessel 85 is also constructed to withstand the temperature and pressure associated with the mixing of the monoatomic and molecular oxygen to form ozone. The pressure in the second vessel may be maintained much below the pressure in the first vessel, to induce the supersonic flow from the first vessel through the convergent-divergent nozzle to the second vessel. While the second vessel 85 may be at atmospheric pressure, preferably, the second vessel is maintained at a pressure above atmospheric pressure to encourage the production of ozone (because of LeChatalier's Principle discussed above). The temperature and pressure of the second vessel may be any conditions at which the formation of ozone from monoatomic oxygen or from monoatomic oxygen and molecular oxygen pursuant to Equation I is maintained.

The second vessel 85 is in communication with a hose or pipe 105 to deliver the ozone formed in the second vessel to its intended point of use. Optionally, an ozone diffuser 110 may be provided to diffuse the ozone from a concentrated stream to a diffuse supply. The diffuser 110 is preferably supplied where the ozone is required to be passed diffusely through a medium, for example in a water purification process.

It will be appreciated that various additions and modifications may be made to the spirit of the above described invention, the scope of which is limited only by the appended claims.

We claim:

1. A method of producing ozone comprising:
  (a) providing a supply of monoatomic oxygen at a first temperature and pressure at which the equilibrium between monoatomic oxygen and molecular oxygen lies in favour of production of monoatomic oxygen;
  (b) supersonically expanding and cooling the monoatomic oxygen to a second temperature lower than the first temperature to obtain supersonically cooled and expanded monoatomic oxygen; and, (c) combining the supersonically cooled and expanded monoatomic oxygen to form ozone.

2. The method as claimed in claim 1 wherein the step of producing monoatomic oxygen comprises subjecting a gas containing molecular oxygen to conditions which shift the equilibrium to the right side of the equation:

$$O_2 <==== >2O$$

to favour the production of monoatomic oxygen over the production of molecular oxygen.

3. The method as claimed in claim 2 wherein the step of producing monoatomic oxygen comprises heating a gas containing molecular oxygen to favour the production of monoatomic oxygen.

4. The method as claimed in claim 3 wherein the step of heating the molecular oxygen comprises heating the oxygen to a temperature above about 2300° K.

5. The method as claimed in claim 1, wherein the step of expanding and cooling the monoatomic oxygen comprises passing the monoatomic oxygen through a convergent-divergent nozzle.

6. The method as claimed in claim 1 wherein the step of combining the supersonically cooled and expanded monoatomic oxygen to form ozone is conducted under conditions which shifts the equilibrium to favour the production of ozone.

7. The method as claimed in claim 1 wherein the second temperature is below about 1000° K.

8. The method as claimed in claim 1 wherein the supersonically cooled and expanded monoatomic oxygen is subjected to an elevated pressure to assist in the formation of ozone.

9. The method as claimed in claim 1 further comprising the step of introducing molecular oxygen to the supersonically cooled and expanded monoatomic oxygen to form ozone.

10. The method as claimed in claim 9 wherein the molecular and monoatomic oxygen are mixed under conditions which shift the equilibrium to the right hand side of the equation:

$$O+O_2 <====== >O_3$$

to favour production of ozone.

11. The method as claimed in claim 9 wherein the molecular and monoatomic oxygen are mixed to form ozone at a temperature below about 1000° K.

12. The method as claimed in claim 11 wherein the molecular and monoatomic oxygen are mixed under pressure.

13. A method of producing ozone comprising:

(a) heating molecular oxygen under pressure to a temperature greater than about 2300° K to cause at least a portion of the molecular oxygen to dissociate into monoatomic oxygen; and, (b) expanding and cooling the monoatomic oxygen under frozen flow conditions to a temperature below about 1000° K to form ozone.

14. The method as claimed in claim 13 wherein the expanded and cooled monoatomic oxygen is mixed with molecular oxygen to form ozone.

15. The method as claimed in claim 13 wherein the step of heating the molecular oxygen comprises heating the oxygen to a temperature from about 3000 to about 5000° K.

16. The method as claimed in claim 13 wherein the step of expanding and cooling the monoatomic oxygen comprises passing the monoatomic oxygen through a convergent-divergent nozzle having an inlet and an outlet at a supersonic speed.

17. The method as claimed in claim 14 wherein the step of mixing the molecular and monoatomic oxygen comprises mixing under conditions which shift the equilibrium to the right in the equation:

$$O+O_2 <======>O_3$$

to favour production of ozone.

18. The method as claimed in claim 17 wherein the step of mixing the monoatomic and molecular oxygen comprises mixing the monoatomic and molecular oxygen under pressure.

19. The method as claimed in claim 13 wherein after step (b) the monoatomic oxygen is subjected to equilibrium conditions which favour the production of ozone.

20. The method as claimed in claim 13 wherein the monoatomic oxygen is expanded and cooled to a temperature from about 300 to about 500° K.

21. The method as claimed in claim 13 wherein the monoatomic oxygen is raised to an elevated pressure to assist in the formation of ozone.

* * * * *